United States Patent
Pazhyannur et al.

(10) Patent No.: US 11,696,128 B2
(45) Date of Patent: Jul. 4, 2023

(54) REDUCING AUTHENTICATION STEPS DURING WI-FI AND 5G HANDOVER

(71) Applicant: Cisco Technology, Inc., San Jose, CA (US)

(72) Inventors: Rajesh S. Pazhyannur, Fremont, CA (US); Anand Oswal, Pleasanton, CA (US); Arun G. Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 16/865,959

(22) Filed: May 4, 2020

(65) Prior Publication Data

US 2021/0112408 A1 Apr. 15, 2021

Related U.S. Application Data

(60) Provisional application No. 62/912,813, filed on Oct. 9, 2019.

(51) Int. Cl.
*H04W 12/06* (2021.01)
*H04W 12/041* (2021.01)
(Continued)

(52) U.S. Cl.
CPC ......... *H04W 12/06* (2013.01); *H04W 12/041* (2021.01); *H04W 12/0431* (2021.01);
(Continued)

(58) Field of Classification Search
CPC .............. H04W 12/06; H04W 12/106; H04W 12/0431; H04W 12/041; H04W 84/042; H04W 84/12
See application file for complete search history.

(56) References Cited

U.S. PATENT DOCUMENTS 9,497,667 B2 11/2016 Wang et al.
2016/0134610 A1* 5/2016 Lee .................. H04L 63/0414
726/7
(Continued)

FOREIGN PATENT DOCUMENTS

WO 2009/154640 12/2009

OTHER PUBLICATIONS

Wienzeketal, "Fast Re-Authentication for Handovers in Wireless Communication Networks", 2006, pp. 1-12, downloaded from https://dl.ifip.org/db/conf/networking/networking2006/ (Year: 2006).*

(Continued)

*Primary Examiner* — Linglan Edwards
*Assistant Examiner* — Forrest L Carey
(74) *Attorney, Agent, or Firm* — Polsinelli

(57) ABSTRACT

Technologies for systems, methods and computer-readable storage media for reducing the time to complete authentication during inter-technology handovers by reusing security context between 5G and Wi-Fi. Assuming, that the administrative domain for Wi-Fi and 5G match (and belongs to an enterprise for instance), using an already established security context in one technology to do fast authentication in the other technology during handover. Specifically, if UE is on Wi-Fi and handing over to 5G, use its Wi-Fi security context to do fast security setup in 5G, which includes a corresponding method for use when the UE goes from 5G to Wi-Fi.

20 Claims, 8 Drawing Sheets

(51) Int. Cl.
*H04W 12/106* (2021.01)
*H04W 12/0431* (2021.01)
*H04W 84/04* (2009.01)
*H04W 84/12* (2009.01)

(52) U.S. Cl.
CPC ........ *H04W 12/106* (2021.01); *H04W 84/042* (2013.01); *H04W 84/12* (2013.01)

(56) References Cited

U.S. PATENT DOCUMENTS

| | | |
|---|---|---|
| 2017/0244705 A1* | 8/2017 | Ha ........................ H04L 63/061 |
| 2018/0115424 A1* | 4/2018 | Bhandaru ............. H04L 9/0861 |
| 2018/0288670 A1 | 10/2018 | Li et al. |
| 2019/0149990 A1* | 5/2019 | Wang ...................... H04W 8/08 |
| | | 370/329 |
| 2019/0274038 A1 | 9/2019 | Wu et al. |
| 2020/0059783 A1* | 2/2020 | Wifvesson ............ H04W 12/06 |

OTHER PUBLICATIONS

El Idrissi et al., "An Eficient Authentication Protocol for 5G Heterogeneous Networks," Researchgate.net, Nov. 2017, pp. 1-14.

\* cited by examiner

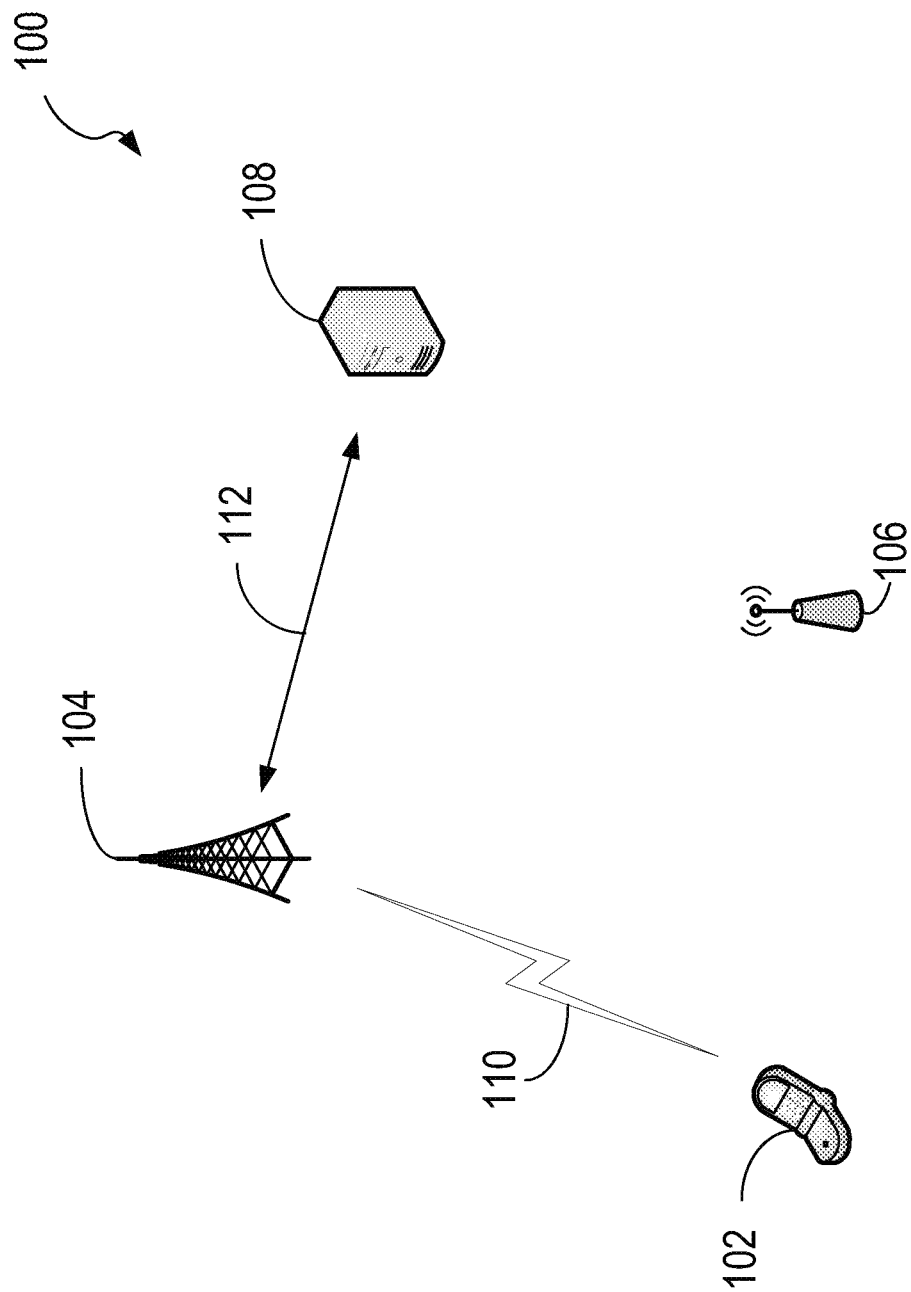

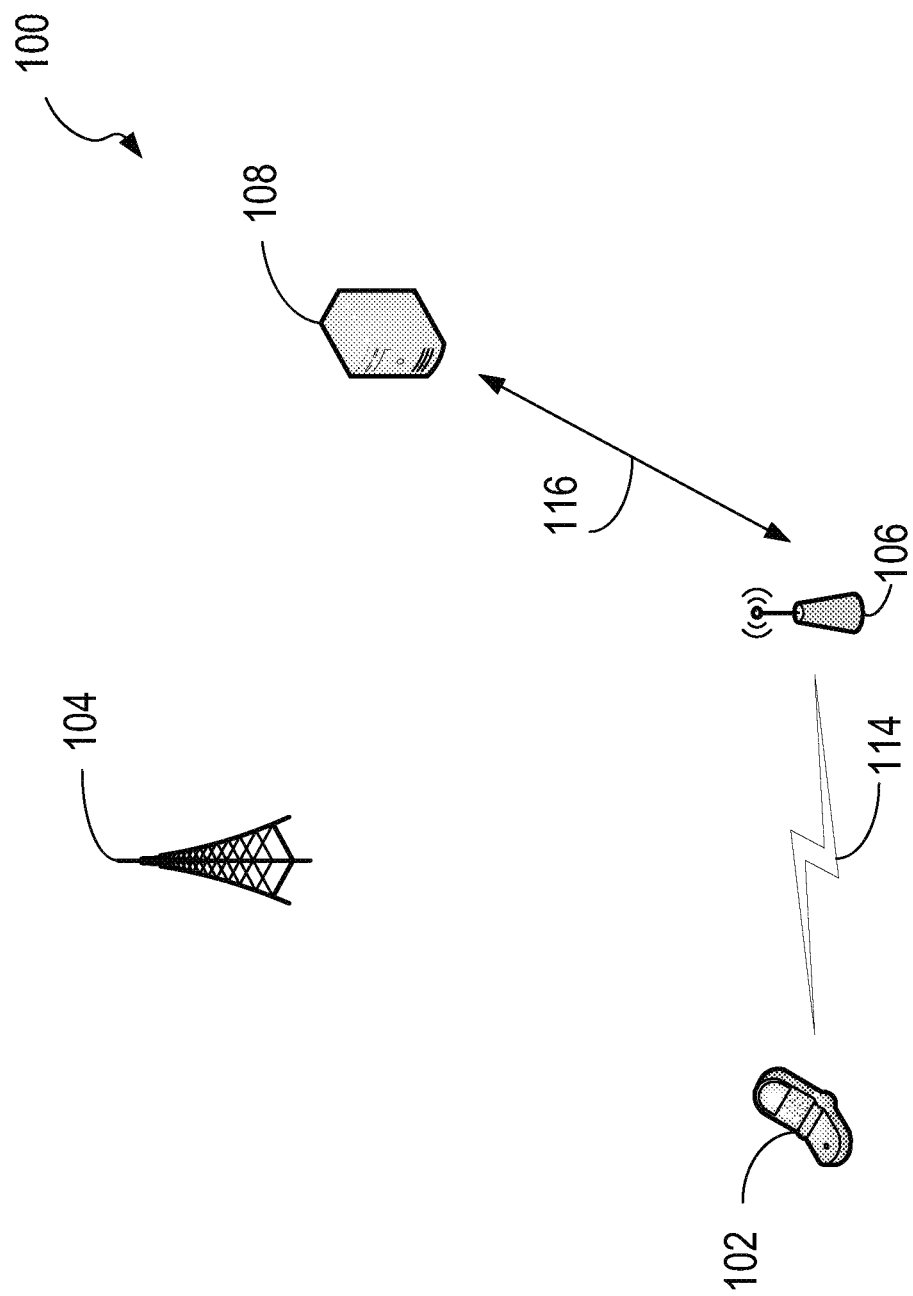

REDUCING AUTHENTICATION STEPS DURING WI-FI AND 5G HANDOVER

CROSS-REFERENCE TO RELATED APPLICATIONS

This application claims priority to U.S. Provisional Patent Application No. 62/912,813, filed on Oct. 9, 2019, entitled "IMPROVING WI-FI, 5G HANDOVER TIME BY REDUCING AUTHENTICATION STEPS DURING HANDOVER," the content of which is incorporated herein by reference in its entirety.

TECHNICAL FIELD

The present disclosure generally relates to the field of Wi-Fi and 5G networking and more specifically to improving 5G and Wi-Fi handovers.

BACKGROUND

The radio access network (RAN) has been in use since the beginning of cellular technology and has evolved through the generations of mobile communications (1G through 5G). Components of the RAN include a base station and antennas that cover a given region depending on their capacity. Access Points (APs) provide a secure, affordable, and easy-to-use wireless Local Area Network (LAN) access that combines mobility and flexibility with the enterprise-class features desired by networking professionals. An access point serves as the connection point between wireless and wired networks or as the center point of a stand-alone wireless network. In large installations, wireless users within the radio range of an access point can roam throughout a facility while maintaining seamless, uninterrupted access to the network. Each access point platform may contain one or more radios.

A user equipment (UE), which can include any device used by an end-user to communicate such as a hand-held telephone or laptop computer equipped with a mobile broadband adapter, may often need to switch between a Wi-Fi network and a 5G network when moving or roaming for example. In such examples, a handover between the Wi-Fi network and the 5G network may involve or require a complete re-authentication in the handover process. Unfortunately, the re-authentication process can often cause handover or connectivity delays, latency and interruptions, which can affect the user experience.

BRIEF DESCRIPTION OF THE FIGURES

To provide a more complete understanding of the present disclosure and features and advantages thereof, reference is made to the following description, taken in conjunction with the accompanying drawings, in which:

FIGS. 1A and 1B illustrate an example inter-technology network, according to an aspect of the present disclosure;

DETAILED DESCRIPTION

Figure 2A:
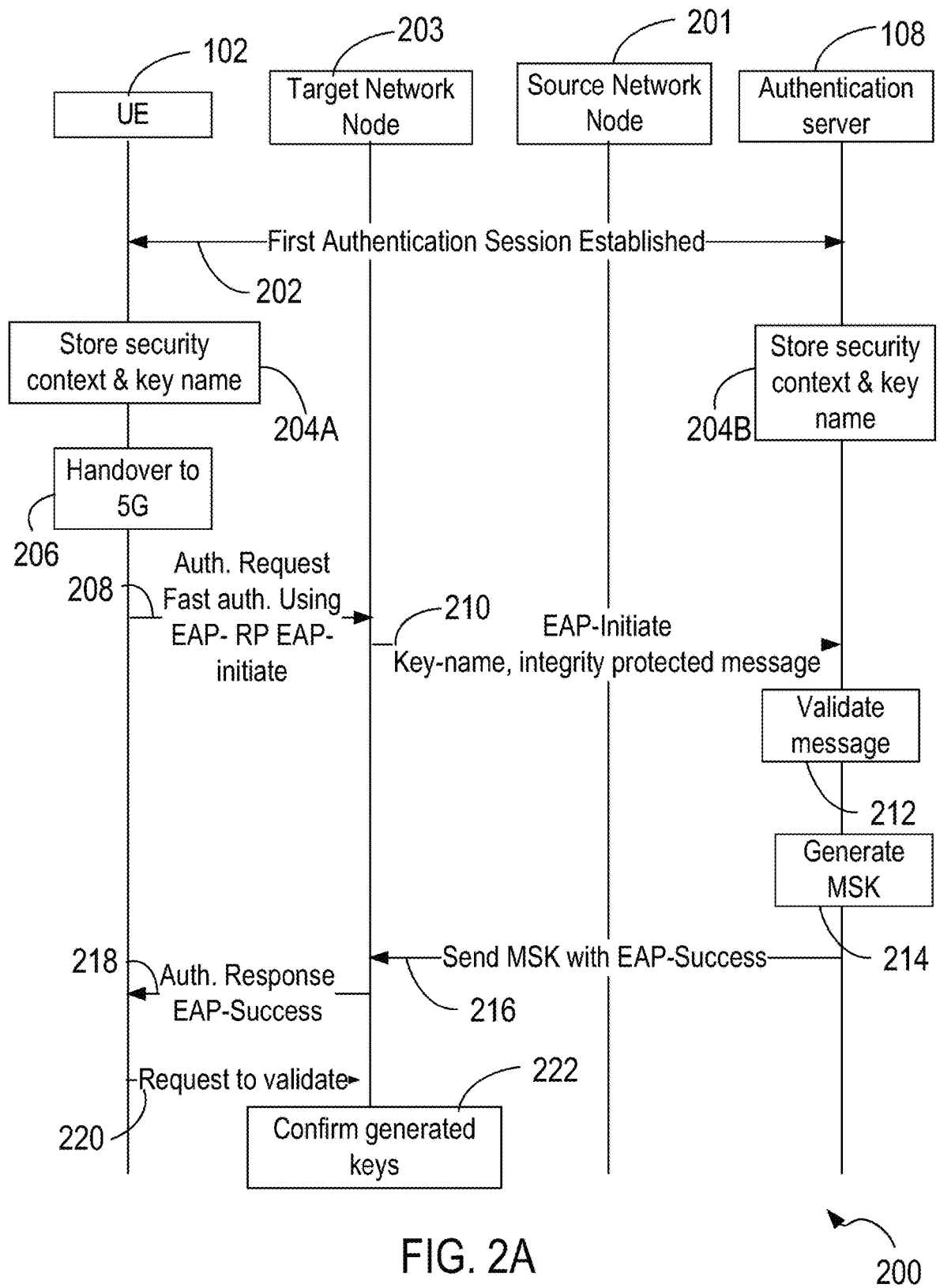
FIG. 2A illustrates an example flow diagram of a user equipment (UE) handover between a Wi-Fi network and a 5G network from a source networking node to a target networking node according to an aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems, methods and computer-readable storage media for reducing the time to complete authentication during inter-technology handovers between 5G networks and Wi-Fi networks by reusing security context.

An example computer-implemented method can include: receiving, at a network node associated with a first network and from a User Equipment (UE), a re-authentication initiate request comprising a key name associated with a previously-authenticated session of the UE at a second network, the first network comprising one of a 5G network or a Wi-Fi network and the second network comprising a different one of the 5G network or the Wi-Fi network; sending the re-authentication initiate request with the key name to an authentication server associated with the first network and the second network; receiving, from the authentication server, a re-authentication master session key (MSK) associated with a session of the UE authenticated for the first network based on the key name associated with the previously-authenticated session at the second network; sending, by the network node, a generated session key to the UE, the generated session key being generated based on the re-authentication MSK; and validating an authentication session of the UE for the first network based on the generated session key.

Prior to receiving the re-authentication initiate request, the UE may be authenticated for the second network to yield an authenticated session between the UE and a second network node associated with the second network, the UE being authenticated based on the key name. The first network may be the Wi-Fi network and the second network may be the 5G network, or vice versa. The first network and the second network may share an administrative domain or belong to a same enterprise. The re-authentication initiate message may be an Extensible Authentication Protocol Re-Authentication Protocol (EAP-RP) re-authentication initiate request. Additionally, the EAP-RP re-authentication initiate message may implement one or more EAP extensions suitable for wireless networks including EAP-Transport Layer Security (EAP-TLS), Protected EAP (PEAP), or EAP-Tunneled TLS (EAP-TTLS).

An example system, may comprise one or more processors and memory including instructions that, when executed by the one or more processors, cause the one or more processors to: store, at an authentication server, a key name and associated security context, the key name associated with a successful authentication of the UE for a first network to yield an authenticated session between the UE and a first network node, the first network comprising a 5G network or a Wi-Fi network; receive, from a second network node associated with a second network, an re-authentication initiate message comprising the key name and an integrity protected message, the re-authentication initiate message requesting authentication of the UE for the second network based on the key name, the second network comprising a different one of the 5G network or the Wi-Fi network; and authenticate the second network node based on the key name, wherein authenticating the second network node comprises reusing a security context from successful authentication of the UE for the first network for a handover from the first network to the second network.

This overview is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

EXAMPLE EMBODIMENTS

Disclosed are systems, methods, and computer-readable storage media that address the above technical issues and others by reducing the overall handover time between Wi-Fi and 5G network connectivity for a User Equipment (UE). Thus, the UE may be capable of both 5G and Wi-Fi access, having both radios, and switching between the two networks. In some examples, the Wi-Fi and 5G networks may share a same administrative domain that handles security, access, and/or authentication for both networks. The Wi-Fi and 5G networks may share the same overarching inter-technology network that correspondingly has both capabilities, having both 5G and Wi-Fi components.

FIGS. 1A and 1B illustrate an example inter-technology network 100 wherein the user equipment (UE) 102 can be connected to a Wi-Fi network or a 5G network. FIG. 1A illustrates the inter-technology network 100 when the UE 102 establishes a network connection link 110 with a network node 104 of a 5G network, such as a 5G small cell tower, after authenticating (112) with an authentication server 108, such as an Authentication, Authorization, and Accounting (AAA) server. The 5G network associated with the network node 104 and a Wi-Fi network associated with a Wi-Fi Access Point (AP) 106 may belong to a common administrative domain (e.g., a common enterprise network, a common service provider, etc.) associated with the authentication server 108. The authentication server 108 may thus handle or manage authentication for both the 5G network (and associated devices) and the Wi-Fi network (and associated devices).

FIG. 1B illustrates the inter-technology network 100 when the UE 102 establishes a network connection 114 with a Wi-Fi Access Point (AP) 106 after authenticating (116) with the authentication server 108. When the UE 102 needs to perform a handover (e.g., switch) from a 5G connection (e.g., the network connection 110) to a Wi-Fi connection (e.g., 114) or vice-versa, the UE 102 may need to authenticate with the authentication server 108 for every handover. However, if the 5G network and the Wi-Fi network share the same authentication credentials and the same authentication server 108, reusing the authentication credentials can reduce the handover time with respect to connecting from one network to another.

FIG. 2A illustrates a flow diagram of an example UE handover 200 between connections with Wi-Fi and 5G networks. More specifically, the example flow diagram illustrates a flow from a source network node 201 to a target networking node 203. One of the source networking node 201 and target networking node 203 may reside on one of the networks (5G or Wi-Fi) and can be used by the UE 102 to connect to their respective network, and the other of the source networking node 201 and target networking node 203 may reside on the other network (Wi-Fi or 5G) and can be used by the UE 102 to connect to that respective network. Passing from the source networking node 201 to the target networking node 203 may include a handover from the network connection 110 with the 5G network node 104 to the network connection 114 with the Wi-Fi AP 106. Alternatively, passing from the source networking node 201 to the target networking node 203 may include a handover from the network connection 114 with the Wi-Fi AP 106 to the network connection 110 with the 5G network node 104.

Figure 2B:
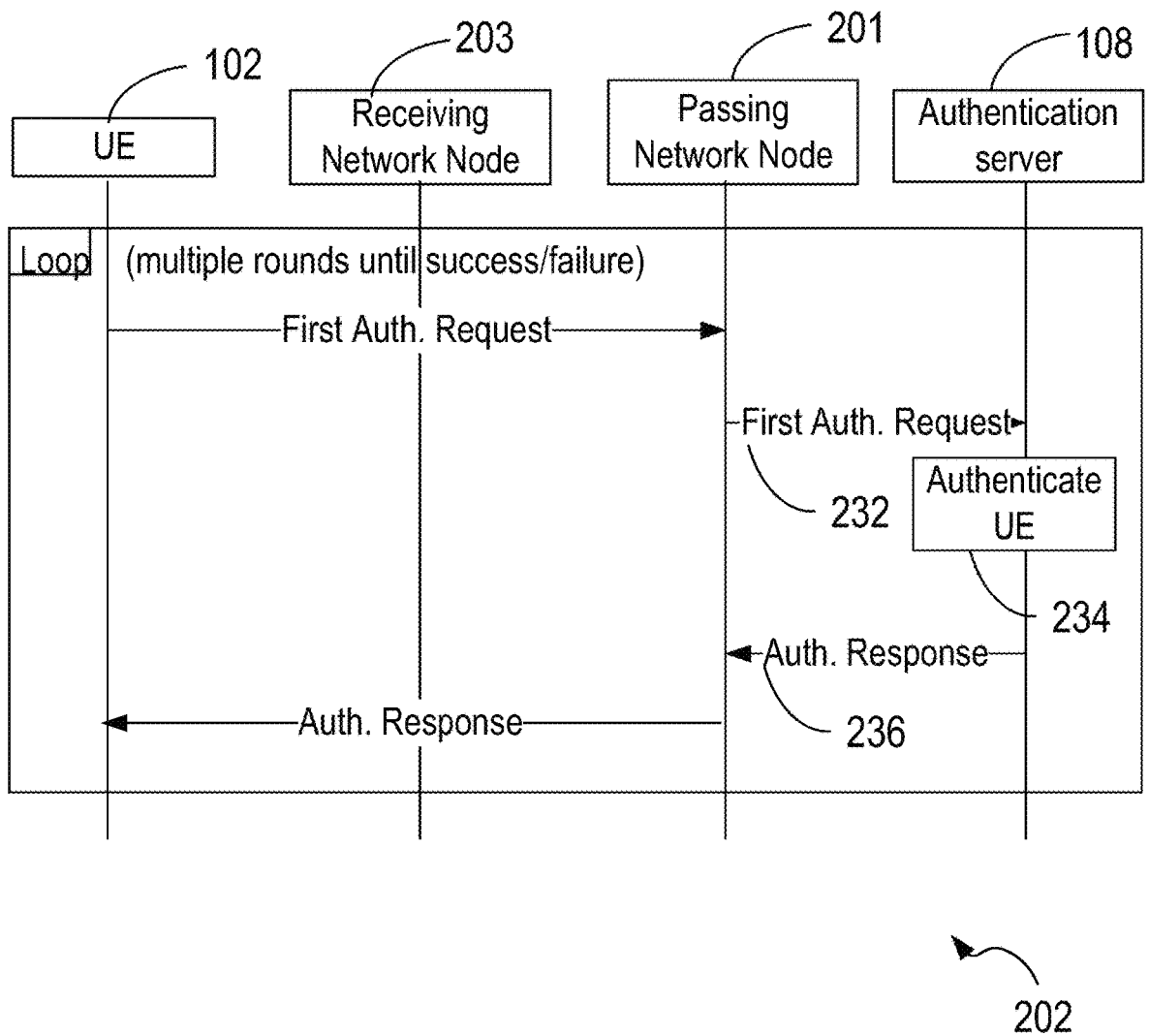
FIG. 2B illustrates an example flow diagram of a first authentication of the UE with the source networking node through an authentication server, according to an aspect of the present disclosure.

The source networking node 201 may first establish a first authentication session 202 with the UE 102 through the authentication server 108. FIG. 2B illustrates in more detail steps for establishing the first authentication session 202. Once the passing network successfully establishes the first authenticated session 202, the UE 102 may store (204A) authentication data, such as a key name associated with a cryptographic key used to establish the successful authentication, along with a security context associated with the key name. The security context can include data associated with the authenticated session such as, for example, a cryptographic key, a device identifier, a user account identifier, session information, permissions or policies, state information, etc. The authentication server 108 may also store the key name and security context at the authentication server 108. Then, when the UE 102 determines (206) that the UE 102 is switching over (e.g., performing a handover) from the passing network of the source networking node 201 (e.g., the 5G network or the Wi-Fi network) to a receiving network of the target networking node 203 (e.g., a different one of the 5G network or the Wi-Fi network), the UE 102 may send an authentication request to the target networking node 203. In order for the handover time to be reduced, the authentication request may be for a fast authentication procedure that allows the UE 102 to reuse the authentication data used by the UE 102 when authenticating in the network associated with the source networking node 201 to authenticate for the network associated with the target networking node 203. In some examples, the authentication request and/or fast authentication procedure can use an authentication protocol, such as an Extensible Authentication Protocol Re-Authentication Protocol (EAP-RP) for example, and can leveraging one or more extensions, such as EAP extensions in accordance with Internet Engineering Task Force (INTF) Request for Comments (RFC) 6696. See RFC 6696 https://tools.ietf.org/html/rfc6696 (hereinafter the "RFC 6696 Protocol"), which is incorporated by reference in its entirety.

The fast authentication leveraging EAP-RP may be initiated by the UE 102 sending (208) an EAP-RP EAP-Initiate message that can include the key name, a sequence number (or nonce), and an integrity protected message, to the target networking node 203, which alerts the target networking node 203 to relay (210) the EAP-RP EAP-Initiate message (including the key name and the integrity protected message) to the authentication server 108. The integrity protected message is generated by the UE using the key associated with the key name which is used as proof that the UE has the key (e.g., cryptographic key) that the key name is associated with. The authentication server 108 then looks up the key name in its lookup index and uses the key and stored security context associated with key name stored at the authentication server 108 to validate (212) the integrity protected message generated by the UE 102.

The authentication server 108 may then generate (214) and send (216) a re-authentication master session key (MSK) associated with the key name and sequence number (sent in 208) and/or the authenticated session with an EAP-Success message back to the target networking node 203. The target networking node 203 may then relay (218) to the UE 102 the EAP-Success message included in an authentication response. The UE 102 may then authenticate a session for the target networking node 203, UE 102 may generate the session key based on its key associated with the key name and the sequence number (nonce). The UE and receiving node may independently generate temporal keys (e.g. a first temporal key and a second temporal key) based on the session key. For example, the UE 102 may then send (220) a request back to the target networking node 203 to validate the temporal keys and the target networking node 203 may confirm (222) the generated keys thereby authenticating the UE 102 for the target networking node 203.

FIG. 2B illustrates a flow diagram of an example method of establishing the first authentication session 202 for connecting with the source network node 201, which can be either the Wi-Fi or 5G network, with steps that may be looped until success of the authentication and/or connection. The example steps may include: receiving (232), from the UE 102, an initial authentication request at the source networking node 201; authenticating (234) the UE 102 with the authentication server 108; and sending (236), by the source networking node 201, an initial authentication response to the UE 102 to establish a network session between the UE 102 and the source networking node 201. In other words, the steps authenticate, prior to receiving the re-authentication initiate request, by the authentication server 108, the UE 102 for the passing network to yield an authenticated session between the UE and the source networking node associated with the passing network. The UE can be authenticated based on security context associated with the UE and the key name associated with the security context and the passing network.

Figure 3A:
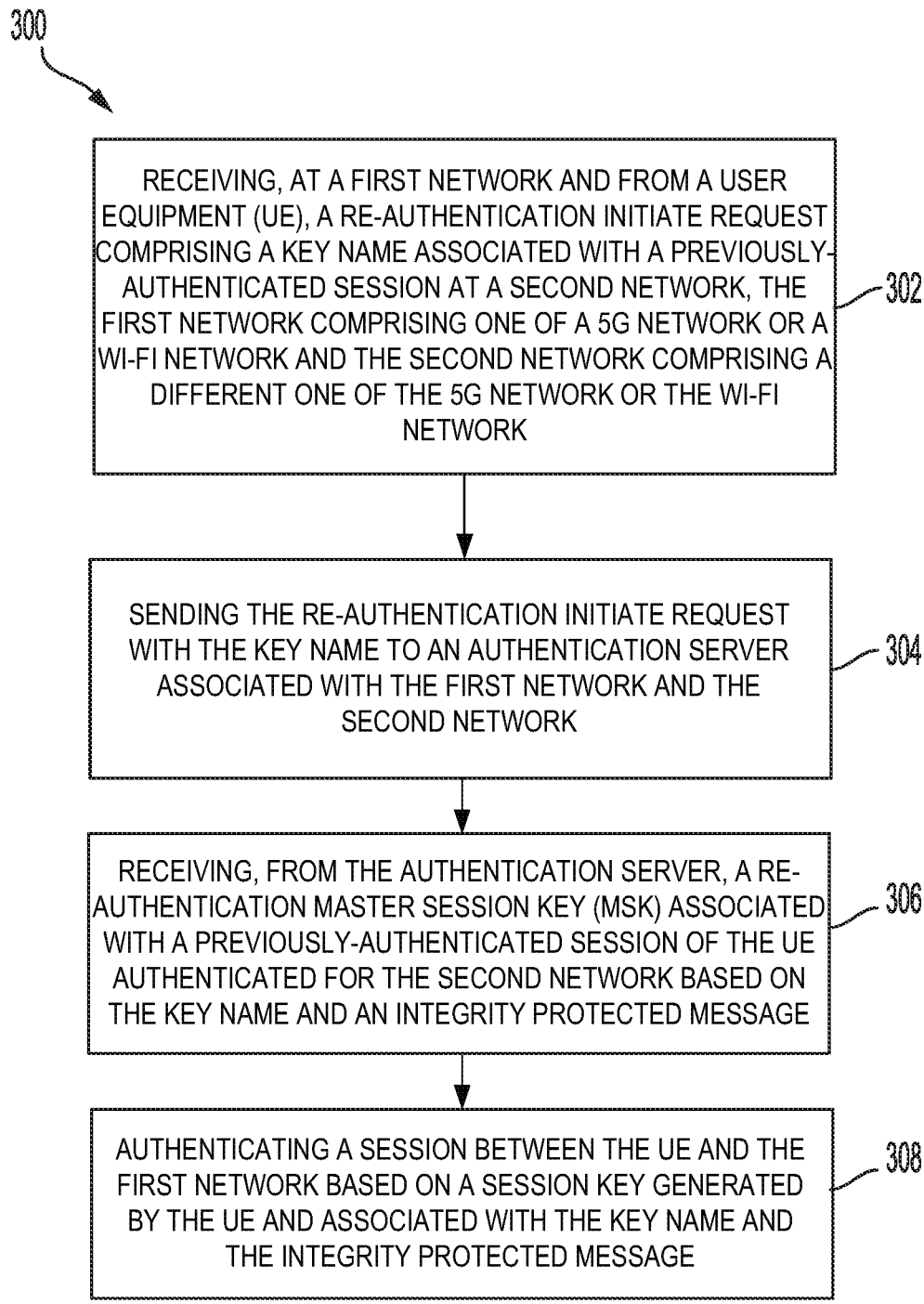
FIG. 3A illustrates an example method for UE handover between Wi-Fi and 5G from the source networking node to the target networking node according to an aspect of the present disclosure.

FIG. 3A illustrates a first example method 300 for the UE handover 200 from a perspective of the target networking node 203. The UE 102 may determine that it is appropriate to handover from the source networking node 201 to the target networking node 203. In some examples, the handover can be triggered by an event, such as the UE 102 losing connectivity (or experiencing connectivity issues) to a network associated with the source networking node 201 and/or moving out of a range of the network associated with the source networking node 201. In other examples, the handover can be triggered by the UE 102 or a user of the UE 102 based on an input or preference. In other examples, the handover can be triggered by any other event, action, and/or condition, such as a policy, a location of the UE 102, a condition of the network associated with the source networking node 201, etc.

The first example method 300 illustrates that, consequently, a first network node (e.g., the target networking node 203) of a first network may receive (302) a re-authentication initiate request, such as an Extensible Authentication Protocol Re-Authentication Protocol (EAP-RP) re-authentication initiate request, including a key name associated with a previously-authenticated session at a second network (e.g., the passing network), and may also include an integrity protected message. The first network may be one of a 5G network or a Wi-Fi network and the second network may be a different one of the 5G network or the Wi-Fi network. If the target networking node 203 operates under the 5G network, the re-authentication initiation request would be carried in a 5G-specific message. Alternatively, if the target networking node 203 operates under a Wi-Fi network, the re-authentication initiation request would be carried in a Wi-Fi-specific message. In some examples, if the authentication initiation request leverages the EAP, the embedded EAP-RP message can use semantics taught in the RFC 6696 Protocol.

The first network node (e.g., the target networking node 203) may then send (304) the re-authentication initiate request with the key name and may also send the integrity protected message to the authentication server 108. The first network node (e.g., the target networking node 203) may then receive (306), from the authentication server 108, a re-authentication master session key (MSK) associated with the previously-authenticated session of the UE 102 authenticated for the second network (e.g., the source network) based on the key name and the integrity protected message. The first network node (e.g., the target networking node 203) may then authenticate (308) a session between the UE 102 and the first network based on a session key generated by the UE 102 and associated with the key name and the integrity protected message. Furthermore, the first and second networks may share an administrative domain or belong to the same enterprise/organization.

Figure 3B:
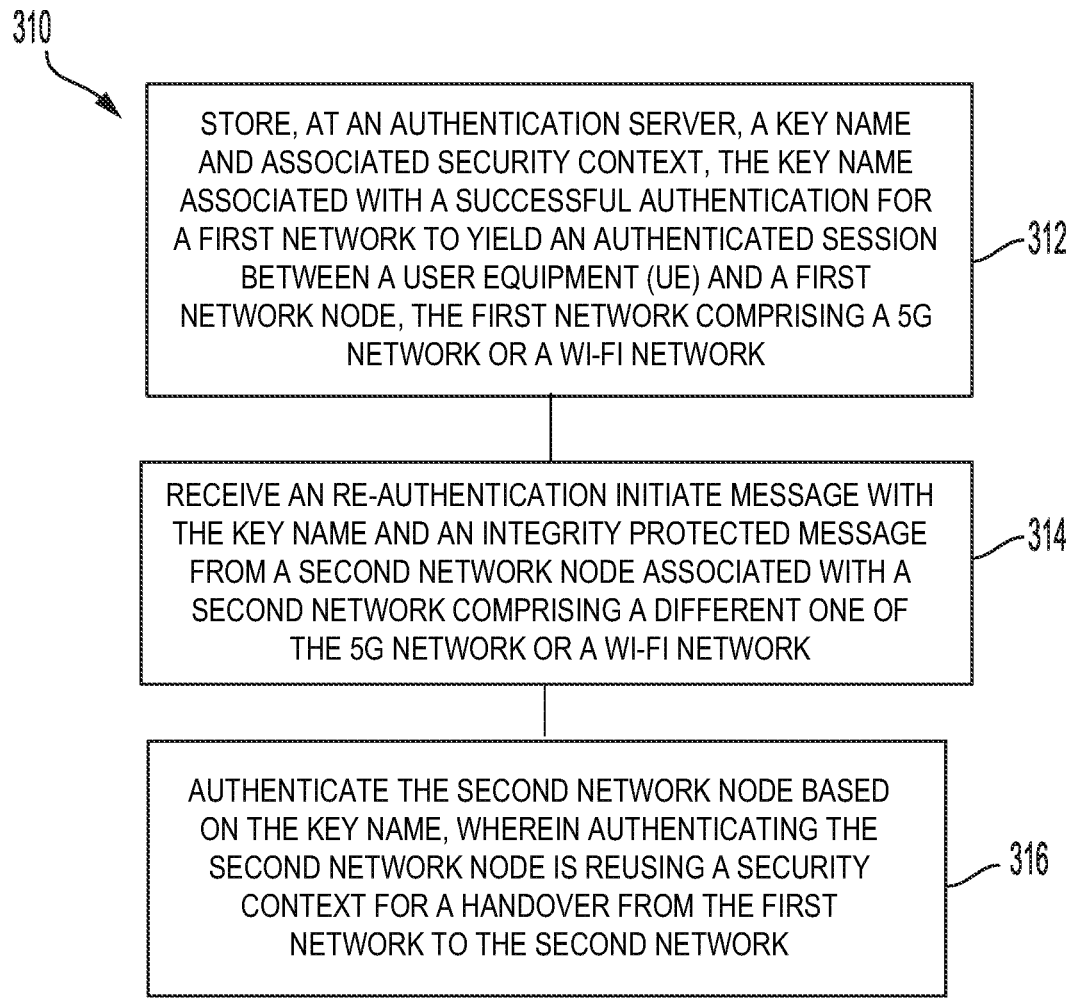
FIG. 3B illustrates an example method for UE handover between Wi-Fi and 5G from the source networking node to the target networking node from a perspective of the authentication server, according to an aspect of the present disclosure.

FIG. 3B illustrates a second example method 310 for the UE handover 200 from a perspective of the authentication server 108. The authentication server 108 may store (312) the key name and associated security context. The key name can be associated with a cryptographic key used in a successful authentication for an established network session between the UE 102 and the first network node (e.g., the source networking node 201). The authentication server 108 may then receive (314) the re-authentication initiate request with the key name and the integrity protected message from a second network node (e.g., target networking node 203). In some examples, the first network node associated with the first network can be a 5G network or a Wi-Fi network, and the second network node associated the second network can be a different one of the 5G network or the Wi-Fi network.

The authentication server 108 may then authenticate (316) the second network node. When authenticating the second network node, the authentication server 108 can reuse a security context from a previous authentication to perform a handover from the first network to the second network. The reuse of the security context for the handover can include an inter-technology handover look up. In some examples, the authenticating may include looking up the key name in a look-up index of the authentication server 108 and validating the integrity protected message with the associated security context to the key name. The authentication server 108 may send a re-authentication master session key (MSK) to the second network node (e.g., target networking node 203).

The authentication server 108 may further validate that the UE 102 has the key that the key name is associated with by determining that the associated security context, such as an encrypted result based on encrypting a number provided, is the same when the authentication server 108 uses its stored key to encrypt the same number. Generally, the UE 102 may support EAP methods, such as EAP-Transport Layer Security (EAP-TLS), Protected EAP (PEAP), or EAP-Tunneled TLS (EAP-TTLS). Some 5G networks, such as those using Security Anchor Function (SEAF), Authentic Server Function (AUSF), or Unified Data Management (UDM) may support the use of these EAP methods. The wireless LAN network may then use the same EAP method as what is chosen for the 5G (e.g., EAP-TLS or EAP-TTLS, or vice versa).

Figure 4:
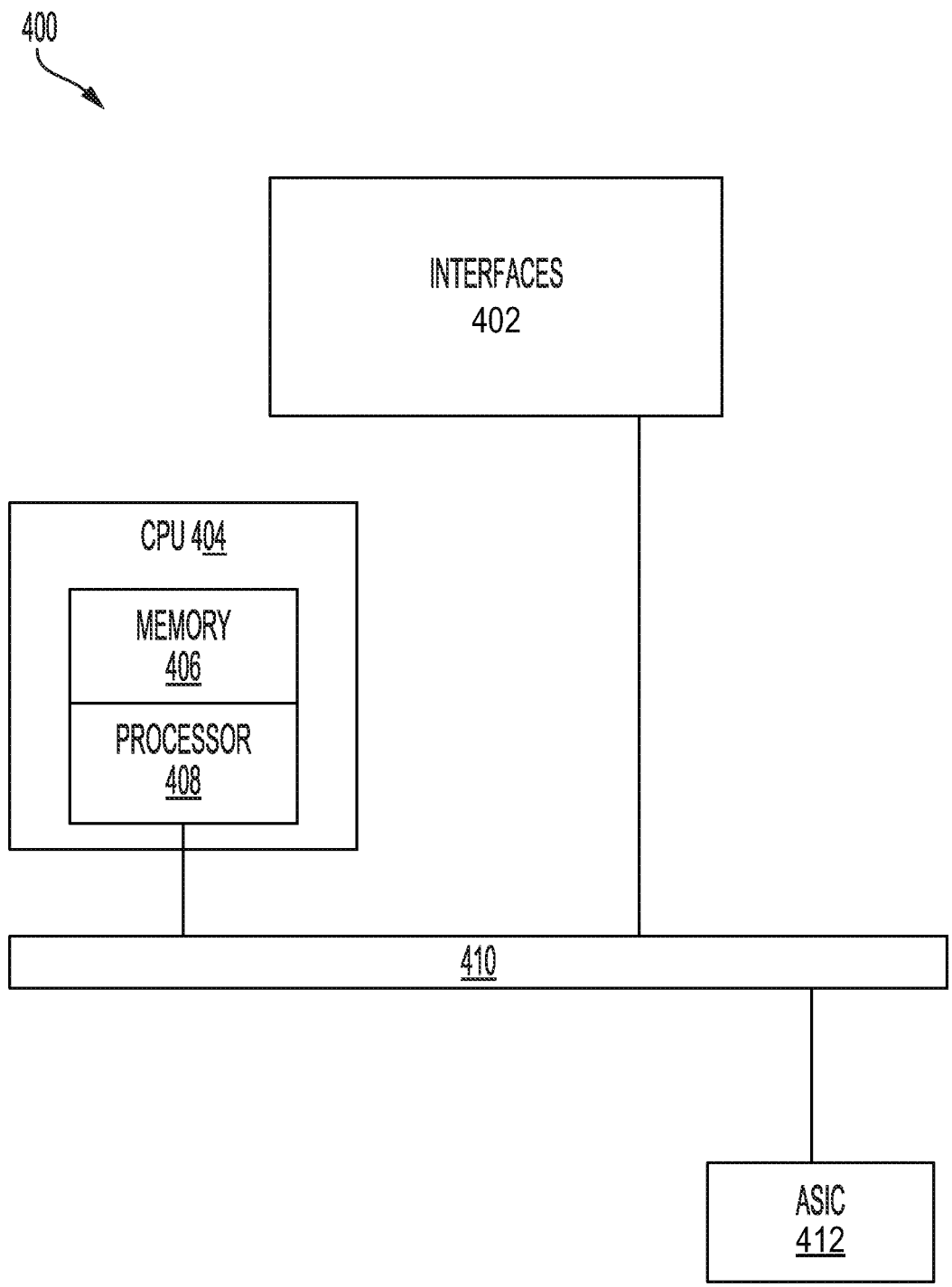
FIG. 4 illustrates an example computing system architecture for use in an example network, according to an aspect of the present disclosure.
Figure 5:
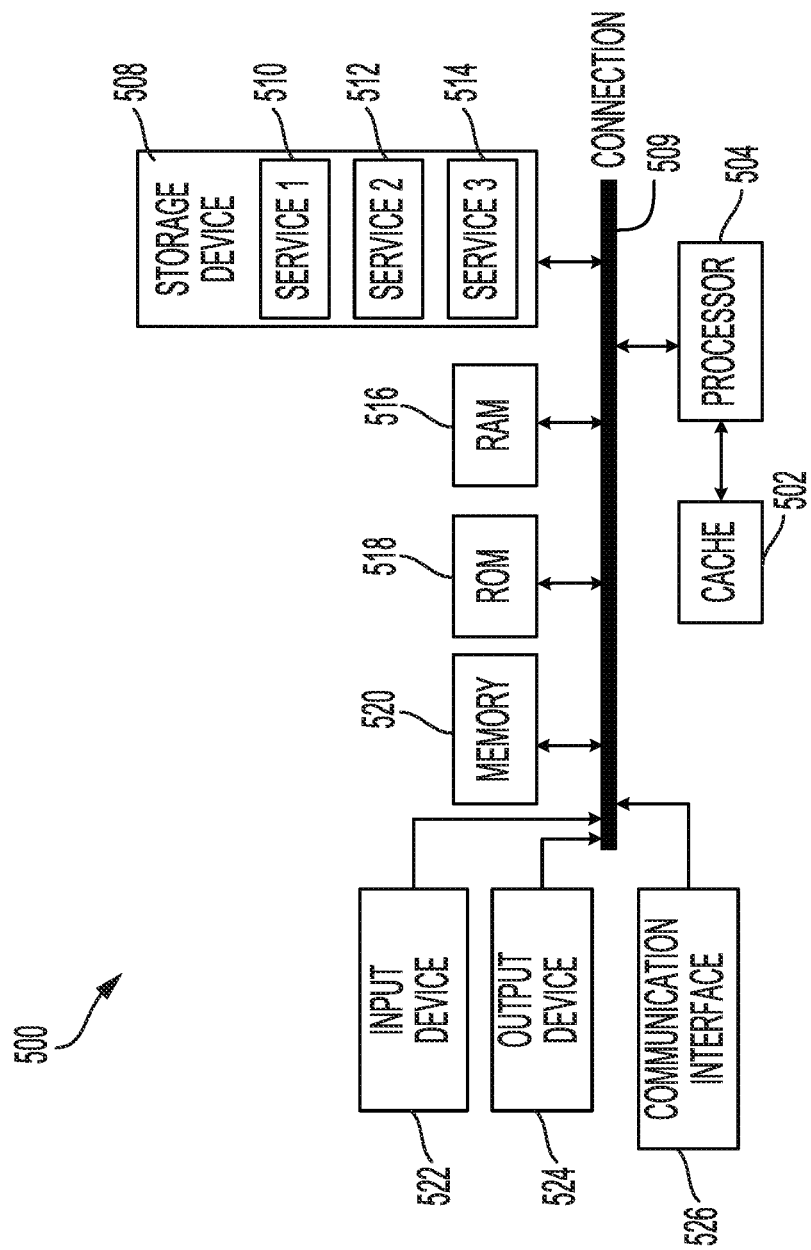
FIG. 5 illustrates an example network device suitable for performing switching, routing, load balancing, and other networking operations, according to an aspect of the present disclosure.

The disclosure now turns to FIGS. 4 and 5, which illustrate example network nodes and computing devices, such as switches, routers, client devices, endpoints, servers, and so forth, which may be implemented as one or more components of networks 100A and 100B described above including, but not limited to, any one of UE 102, the source networking node 201, and the receiving network no, etc.

FIG. 4 illustrates an example network device 400 suitable for performing switching, routing, and other networking operations. Network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 can accomplish these functions under the control of software including an operating system and any appropriate applications software. CPU 404 may include one or more processors 408, such as a processor from the INTEL X86 family of microprocessors. In some cases, processor 408 can be specially designed hardware for controlling the operations of network device 400. In some cases, a memory 406 (e.g., non-volatile RAM, ROM, etc.) also forms part of CPU 404. However, there are many different ways in which memory could be coupled to the system.

The interfaces 402 are typically provided as modular interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 4 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 400 can also include an application-specific integrated circuit (ASIC) 412, which can be configured to perform routing and/or switching operations. The ASIC 412 can communicate with other components in the network device 400 via the connection 410, to exchange data and signals and coordinate various types of operations by the network device 400, such as routing, switching, and/or data storage operations, for example.

FIG. 5 illustrates a computing system architecture 500 including various components in electrical communication with each other using a connection 506, such as a bus. Example system architecture 500 includes a processing unit (CPU or processor) 504 and a system connection 506 that couples various system components including the system memory 520, such as read only memory (ROM) 518 and random access memory (RAM) 516, to the processor 504. The system architecture 500 can include a cache 502 of high-speed memory connected directly with, in close proximity to, or integrated as part of the processor 504. The system architecture 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions.

Other system memory 520 may be available for use as well. The memory 520 can include multiple different types of memory with different performance characteristics. The processor 504 can include any general purpose processor and a hardware or software service, such as service 1 510, service 2 512, and service 3 514 stored in storage device 508, configured to control the processor 504 as well as a special-purpose processor where software instructions are incorporated into the actual processor design. The processor 504 may be a completely self-contained computing system, containing multiple cores or processors, a bus, memory controller, cache, etc. A multi-core processor may be symmetric or asymmetric.

To enable user interaction with the computing system architecture 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing system architecture 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 516, read only memory (ROM) 518, and hybrids thereof.

The storage device 508 can include services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
   receiving, at a target network node associated with a target network and from a User Equipment (UE), a re-authentication initiate request comprising both (1) a key name associated with a previously-authenticated session of the UE at a source network and (2) an integrity protected message generated by the UE using a key identified by the key name, the target network comprising one of a 5G network or a Wi-Fi network and the source network comprising a different one of the 5G network or the Wi-Fi network;
   sending the re-authentication initiate request with the key name to an authentication server associated with the target network and the source network, wherein the authentication server stores the key in connection with the previously-authenticated session of the UE at the source network and prior to receiving the re-authentication initiate request and wherein the authentication server validates the integrity protected message and generates a re-authentication master session key (MSK);
   receiving, from the authentication server, the re-authentication MSK associated with the previously-authenticated session of the UE authenticated for the source network based on the key name; and
   authenticating a session between the UE and the target network based on the re-authentication MSK and a session key generated by the UE and associated with the key name and the integrity protected message.

2. The computer-implemented method of claim 1, wherein, prior to receiving the re-authentication initiate request, the UE was authenticated for the source network to yield the previously-authenticated session between the UE and a source network node associated with the source network, the UE being authenticated based on the key name and the integrity protected message.

3. The computer-implemented method of claim 1, wherein the authenticating the session further comprising:
   sending, by the target network node, a response to the UE that the target network node has the re-authentication MSK;
   generating, by the target network node, a first temporal key and receiving a second temporal key from the UE; and
   confirming the first temporal key and second temporal key match.

4. The computer-implemented method of claim 3, wherein the first temporal key and the second temporal key are independently generated based on the session key.

5. The computer-implemented method of claim 1, wherein the first target network and the source network share an administrative domain or belong to a same enterprise.

6. The computer-implemented method of claim 1 wherein the re-authentication initiate message is an Extensible Authentication Protocol Re-Authentication Protocol (EAP-RP) re-authentication initiate request.

7. The computer-implemented method of claim 6, wherein the EAP-RP re-authentication initiate request implements one or more EAP extensions suitable for wireless networks including EAP-Transport Layer Security (EAP-TLS), Protected EAP (PEAP), or EAP-Tunneled TLS (EAP-TTLS).

8. A non-transitory computer-readable storage medium storing instructions that, when executed by one or more processors, cause the one or more processors to:
   receive, at a target network node associated with a target network and from a User Equipment (UE), a re-authentication initiate request comprising both (1) a key name associated with a previously-authenticated session of the UE at a source network and (2) an integrity protected message generated by the UE using a key identified by the key name, the target network comprising one of a 5G network or a Wi-Fi network and the source network comprising a different one of the 5G network or the Wi-Fi network;
   send the re-authentication initiate request with the key name and the integrity protected message to an authentication server associated with the target network and the source network, wherein the authentication server stores the key in connection with the previously-authenticated session of the UE at the source network and prior to receiving the re-authentication initiate request and wherein the authentication server validates the integrity protected message and generates a re-authentication master session key (MSK);
   receive, from the authentication server, the re-authentication MSK associated with the previously-authenticated session of the UE authenticated for the source network based on the key name; and
   authenticate a session between the UE and the target network based on the re-authentication MSK and on a session key generated by the UE and associated with the key name and the integrity protected message.

9. The non-transitory computer-readable storage medium of claim 8, wherein, prior to receiving the re-authentication initiate request, the UE was authenticated for the source network to yield the previously-authenticated session between the UE and a source network node associated with the source network, the UE being authenticated based on the key name.

10. The non-transitory computer-readable storage medium of claim 8, wherein instructions to authenticate the session further comprising instructions to:
    send, by the target network node, a response to the UE that the target network node has the re-authentication MSK;
    generate, by the target network node, a first temporal key and receiving a generated second temporal key from the UE; and
    confirm the first temporal key and second temporal key match.

11. The non-transitory computer-readable storage medium of claim 10, wherein the first temporal key and the generated second temporal key are independently generated based on the session key.

12. The non-transitory computer-readable storage medium of claim 8, wherein the target network and the source network share an administrative domain or belong to a same enterprise.

13. The non-transitory computer-readable storage medium of claim 8, wherein the re-authentication initiate message is an Extensible Authentication Protocol Re-Authentication Protocol (EAP-RP) re-authentication initiate request.

14. The non-transitory computer-readable storage medium of claim 13, wherein the EAP-RP re-authentication initiate request implements one or more EAP extensions suitable for wireless networks including EAP-Transport Layer Security (EAP-TLS), Protected EAP (PEAP), or EAP-Tunneled TLS (EAP-TTLS).

15. A system for performing authentication, comprising:
one or more processors; and memory including instructions that, when executed by the one or more processors, cause the one or more processors to:
store a key, an associated key name and an associated security context, the key name associated with a successful authentication of a user equipment (UE) for a source network to yield an authenticated session between the UE and a source network node, the source network comprising a 5G network or a Wi-Fi network;
receive, from a target network node associated with a target network, a re-authentication initiate message comprising the key name and an integrity protected message generated by the UE using the key, the re-authentication initiate message requesting authentication of the UE for the target network based on the key name, the target network comprising a different one of the 5G network or the Wi-Fi network;
validate the integrity protected message;
generate, based on the integrity protected message, a re-authentication master session key (MSK); and
authenticate, based on the re-authentication MSK, the target network node based on the key name by reusing a security context from the successful authentication of the UE for the source network for a handover from the source network to the target network.

16. The system of claim 15, wherein the source network is the Wi-Fi network and the second network is the 5G network.

17. The system of claim 15, wherein the source network is the 5G network and the target network is the Wi-Fi network.

18. The system of claim 15, wherein the source network and the target network share an administrative domain or belong to a same enterprise.

19. The system of claim 15, wherein the re-authentication initiate message is an Extensible Authentication Protocol Re-Authentication Protocol (EAP-RP) re-authentication initiate request.

20. The system of claim 19, wherein the EAP-RP re-authentication initiate request implements one or more EAP extensions suitable for wireless networks including EAP-Transport Layer Security (EAP-TLS), Protected EAP (PEAP), or EAP-Tunneled TLS (EAP-TTLS).

* * * * *